United States Patent [19]

Nott

[11] 4,305,382
[45] Dec. 15, 1981

[54] SELF-CONTAINED REFLUX CONDENSER SOLAR WATER HEATER

[75] Inventor: Peter T. M. Nott, Bath, England

[73] Assignee: Technavista, Inc., Victor, N.Y.

[21] Appl. No.: 105,145

[22] Filed: Dec. 19, 1979

[51] Int. Cl.³ .............................................. F24J 3/02
[52] U.S. Cl. .............................. 126/433; 165/104.21; 126/452
[58] Field of Search ............... 126/432, 433, 434, 435, 126/437, 452; 165/105, 110, 108, 114

[56] References Cited

U.S. PATENT DOCUMENTS

| | | | |
|---|---|---|---|
| 3,490,996 | 1/1970 | Kelly, Jr. | 202/234 |
| 4,052,976 | 10/1977 | Hinterberger | 126/433 |
| 4,057,963 | 11/1977 | Basiulis | 126/433 |
| 4,061,131 | 12/1977 | Bohanon | 126/433 |
| 4,080,957 | 3/1978 | Bennett | 126/433 |
| 4,106,557 | 8/1978 | Sonobe et al. | 165/105 |

FOREIGN PATENT DOCUMENTS

| | | | |
|---|---|---|---|
| 1042632 | 5/1955 | France | 165/105 |
| 587310 | 1/1978 | U.S.S.R. | 165/105 |
| 664014 | 5/1979 | U.S.S.R. | 165/105 |

OTHER PUBLICATIONS

Commercial Circular for "Heliopac" C30L Solar Water Package, Jan. 1979.

*Primary Examiner*—James C. Yeung
*Attorney, Agent, or Firm*—Torger N. Dahl

[57] ABSTRACT

Disclosed are apparatus and method for heating water by reflux condensation wherein a solar vaporized heat transfer fluid passes through a condenser in heat exchange relationship with a volume of water. The collection of solar radiation is effected in a primary solar collection region elevated above the condenser. The invention disclosed provides for the recirculation of condensed heat transfer fluid from condenser to the primary collection region. Sequentially, this entails passing condensate by gravity from the condenser into a U-type trap for accumulation until excess condensate causes some spill-over and flow by gravity of condensate into a booster solar collection region, through a venturi. In the booster regin spill over condensate flash vaporizes and is channeled in reverse through the venturi. The velocity of the vapor in the venturi creates low pressure according to the venturi effect, thereby drawing condensate accumulated in the trap into the venturi. Condensate so drawn into the venturi is lifted upward by the booster generated vapor into the primary collector for distribution and re-vaporization. This cycle will repeat intermittently like the percolation of water in a coffee pot.

8 Claims, 3 Drawing Figures

SELF-CONTAINED REFLUX CONDENSER SOLAR WATER HEATER

BACKGROUND OF THE INVENTION

1. Field of the Invention

This invention relates to solar panels. In particular, the invention relates to pumpless recirculation of heat transfer fluid from a heat exchange region, where it is condensed from a vapor to a liquid, back to a higher elevated solar collection region where the liquid is vaporized by solar radiation.

2. Prior Art

In the face of dwindling fossil fuels, a natural worldwide effort has evolved to harness the energy of the sun. Accordingly, a wide variety of so-called solar panels have been developed, many of them to a commercial extent. While the use to which they are made varies from generation of electricity, space heating, etc., their largest area of use lies in the solar heating of water.

Solar hot water heaters are either of the direct heating type wherein water circulates through the solar energy collection region; or of the indirect heating type where water acquires heat by heat exchange with a heat transfer liquid that circulates through the solar collection region. A particular variety of indirect solar heating is that based on the principle of a reflux condenser. That is, a fluid having a low boiling temperature is vaporized in a solar collector and passed through a heat exchanger (hereinafter referred to as a condenser) where it gives up its latent heat of vaporization to water by condensation. Reflux condenser solar water heaters are described, for example, in U.S. Pat. No. 4,080,957 (issued Mar. 28, 1978 to C. J. Bennett).

That a particular solar water heater is capable of its water heating task is no guarantee of commercial success nor is it assurance that overall price and energy consumption will be sufficiently attractive to the average user. In the reflux condenser solar water heater, configuration, bulk and the means by which heat transfer liquid condensate is recirculated to the solar collector are major concerns. In the C. J. Bennett solar heater, heat transfer liquid condensing within a jacket surrounding a water pipe passes back to the solar collection panel by gravity. Of necessity, therefore, the condenser is elevated higher than the solar collection region. Although this avoids the need for separately powered pumps to recirculate condensate, the advantage is outweighed by excessive bulk attributable to the positioning of condenser relative to collector. To reduce bulk, one may consider hypothetically to position the condenser at a lower elevation than the collector. Under that arrangement the condensate must be pumped or otherwise transported to the solar collector, gravity flow no longer being possible. Use of an electric pump, of course, is a common expedient but poses an additional installation step and requires electricity that detracts from the unit's efficiency. Vacation homeowners that have no electricity, moreover, cannot use such units.

A pumpless system for moving liquid, particularly water, as vapor upward from a lower elevation is described in U.S. Pat. No. 3,490,996 (issued Jan. 20, 1970 to H. C. Kelly, Jr.). The patent discloses collecting water vapor from a reservoir and passing the vapor into a duct that concentrates solar energy and discharges the vapor into a higher elevated second reservoir. The concentration of solar energy on the duct continuously drives the water vapor upward at high velocity where it condenses in the second reservoir. An arrangement within the duct provides for entrainment of slower moving vapor in the high velocity vapor. It is clear from the teachings of the U.S. Pat. No. 3,490,996 patent that solar energy is primarily intended to facilitate vapor transport as opposed to liquid transport. If this principle were applied to a reflux condenser solar water heater, condensate from the condenser might flow to a lower portion of a solar collector, vaporize, and pass through the major upper portion of the collector as vapor before returning to the condenser. Advantage of the large surface area of the collector to vaporize large quantities of heat transfer liquid per unit time may thus be lost, producing what would appear to be a less efficient solar collector compared to one in which heat transfer fluid is introduced as liquid at the top of the collector and distributed by gravity throughout substantially all of the collection region before vaporizing.

SUMMARY OF THE INVENTION

The environment of this invention is a solar water heater functioning on the reflux condenser principle. That is, water is heated indirectly by the sun by heat exchange with a heat transfer fluid that has been vaporized in a primary solar collection region. Heat exchange is accomplished in a condenser region where the vaporized heat transfer fluid condenses to liquid transferring thereby large amounts of heat of vapor-to water in a surrounding tank. A feature of the present solar water heater is the lower elevation of the condenser region relative to primary solar collection region, making possible low bulk, slim configuration and insulation convenience of a complete unit including condenser and solar collector. The invention, therefore, provides for pump-free and electricity-free recirculation of condensed heat transfer fluid to the higher primary collection region so that condensate can again be distributed to the usually large area of primary solar collection for re-vaporization. To this end, a booster solar collector elevated below the condenser, and a condensate accumulator and a venturi both disposed in a line connecting the condenser with the booster collector cooperate to intermittently lift a mixture of both vaporized and condensed heat transfer fluid to the higher primary collector. In this regard, the invention operates in a manner and sounds similar to a coffee percolator. In operation, a quantity of condensate accumulates in the accumulator during which time the booster collector is preheated by solar energy. When the accumulator reaches a preselected capacity of condensate, additional condensate flowing thereto causes some condensate to overflow by gravity into and through the venturi down into the booster collector where it is flash vaporized and channeled in reverse to the venturi. There, the velocity of the vapor increases causing, by venturi effect, a pressure drop which sucks the remaining condensate in the accumulator into the venturi and lifts the condensate upward, through a line, into the primary collector for distribution. The cycle of overflow-flash vaporize-lift will intermittently self-repeat at a rate in accordance with the rate of condensate accumulation in the accumulator.

A preferred embodiment includes means operating in response to the temperature of the water heated in the condenser to shut off further flow of heat transfer fluid condensate to the booster collection region. This, in turn, prevents further percolation of condensate to the primary collector and accordingly ceases further water heating as described.

DETAILED DESCRIPTION OF THE INVENTION

In discussing the various features of the invention, reference will be made to the accompanying illustrations in which FIG. 1 is a frontal view in cross section of the solar water heater in accordance with this invention;

Figure 1:
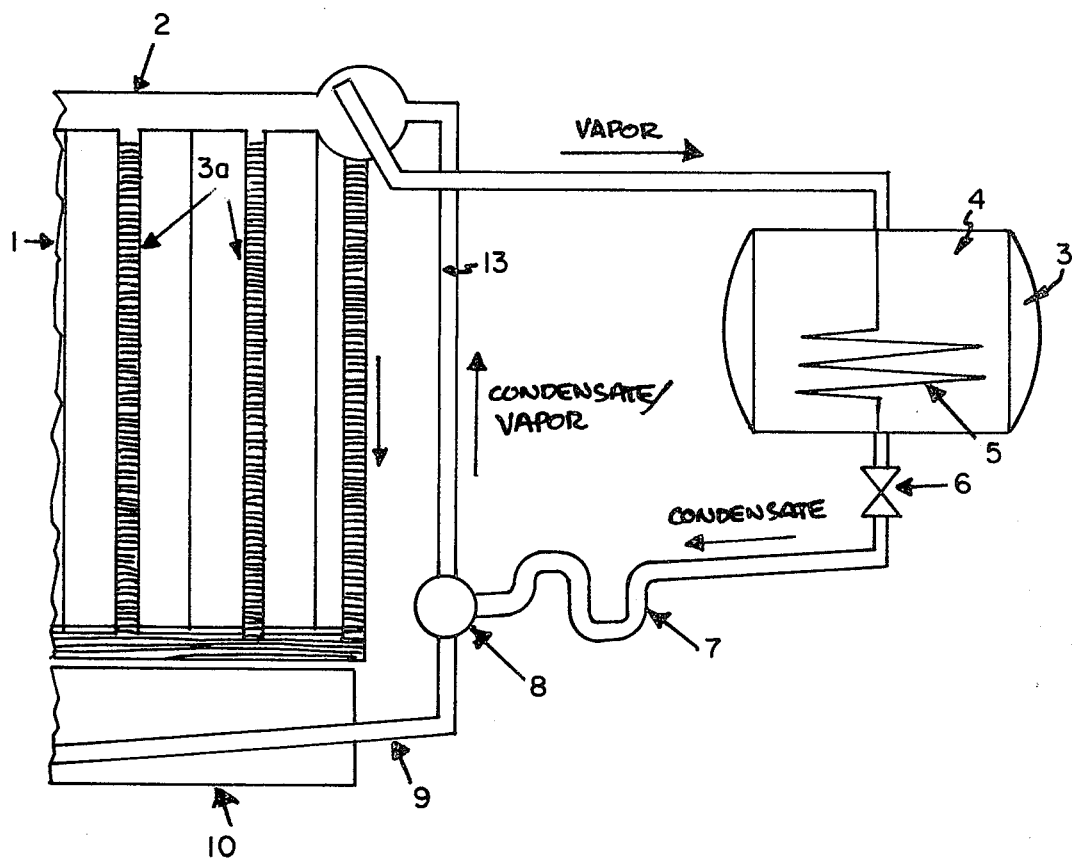

The invention, as noted, provides solar boosted recirculation of heat transfer fluid condensate from a condenser to a higher elevated primary solar collector. FIG. 1 depicts a reflux condenser solar water heater embodying the present invention. In particular, the heater comprises a primary solar collector 1 to which vaporizable (under the solar conditions anticipated) heat transfer fluid is distributed by a manifold 2 through ducts 3a, preferably fabricated of copper. Solar energy vaporizes the heat transfer fluid, and the vapor passes to the lower elevated condenser 3. Condenser 3 comprises a tank 4 carrying water to be heated and internal coils 5 in which the vapor is condensed to a liquid (hereinafter condensate). With regard to the flow of vapor downward from the higher elevation at the primary solar collector 1, the process of condensation entails reduction of volume when the vapor condenses thereby creating a driving force to bring in additional vapor.

Condensate flows out of condenser 3 by gravity subject to the interruption in flow by control valve 6, as will be later discussed. At this point, departure is made from prior practices relating to the recirculation of condensate to primary collector 1. In particular, the invention provides that condensate flow to a condensate accumulation region, depicted as trap 7. When the trap fills with condensate, an overflow of condensate follows and the overflow passes by gravity through a venturi 8 through line 9 into a booster solar collector 10 where the condensate takes up momentary residence. In the booster collector 10, the overflow condensate flash vaporizes and the vapor passes out of booster collector 10 via the same line 9 the condensate entered, and further in reverse to venturi 8.

Figure 2:
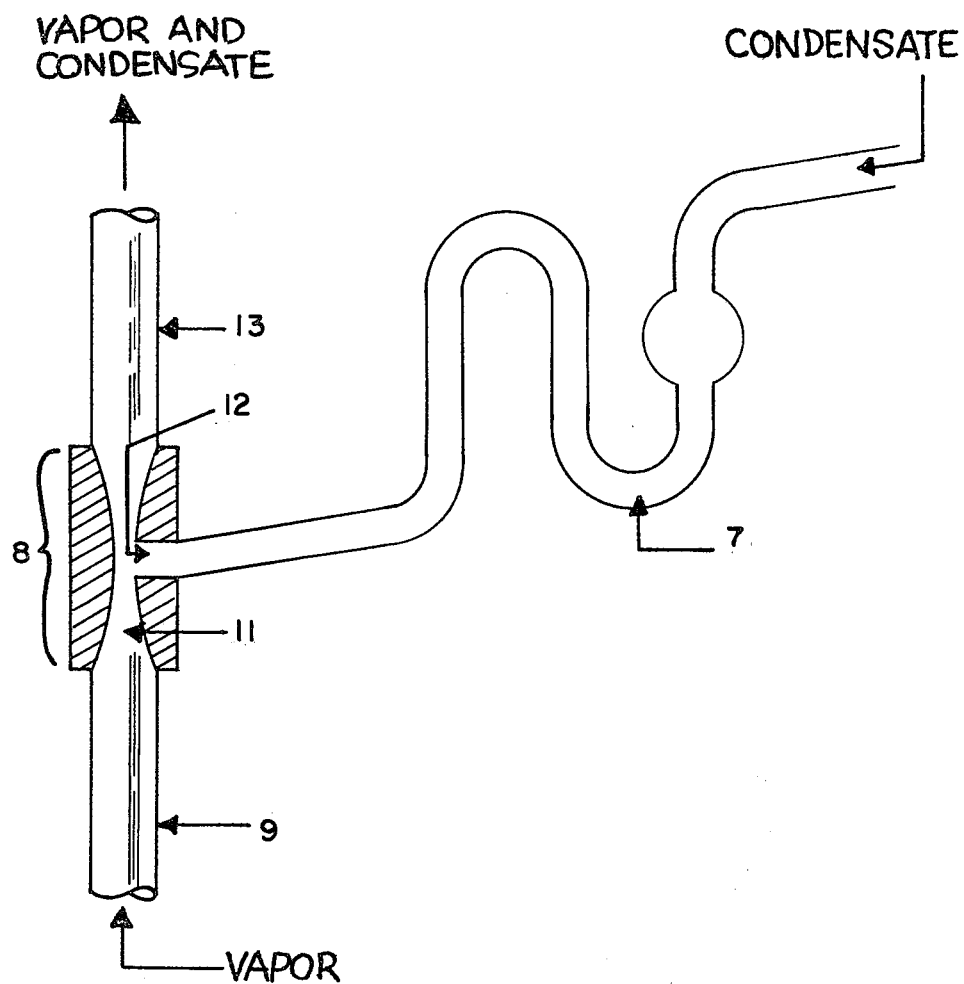
FIG. 2 is a view in cross section of a venturi region employed in accordance with the invention to lift condensate to higher elevations.

FIG. 2 shows an enlargement of venturi 8. Vapor passing in reverse out of booster collector 10 enters the venturi throat 11 and gains velocity. Simultaneously, a pressure drop is experienced at aperture 12 that sucks concensate accumulated in trap 7 into venturi 8. In the venturi 8, the force of the boosted vapor lifts the condensate upward into vertical duct 13 and further overhead into manifold 2 (FIG. 1). There, recirculated condensate distributes throughout primary collector 1 through ducts 3a for re-vaporization while boosted vapor continues on toward condenser 3.

Figure 3:
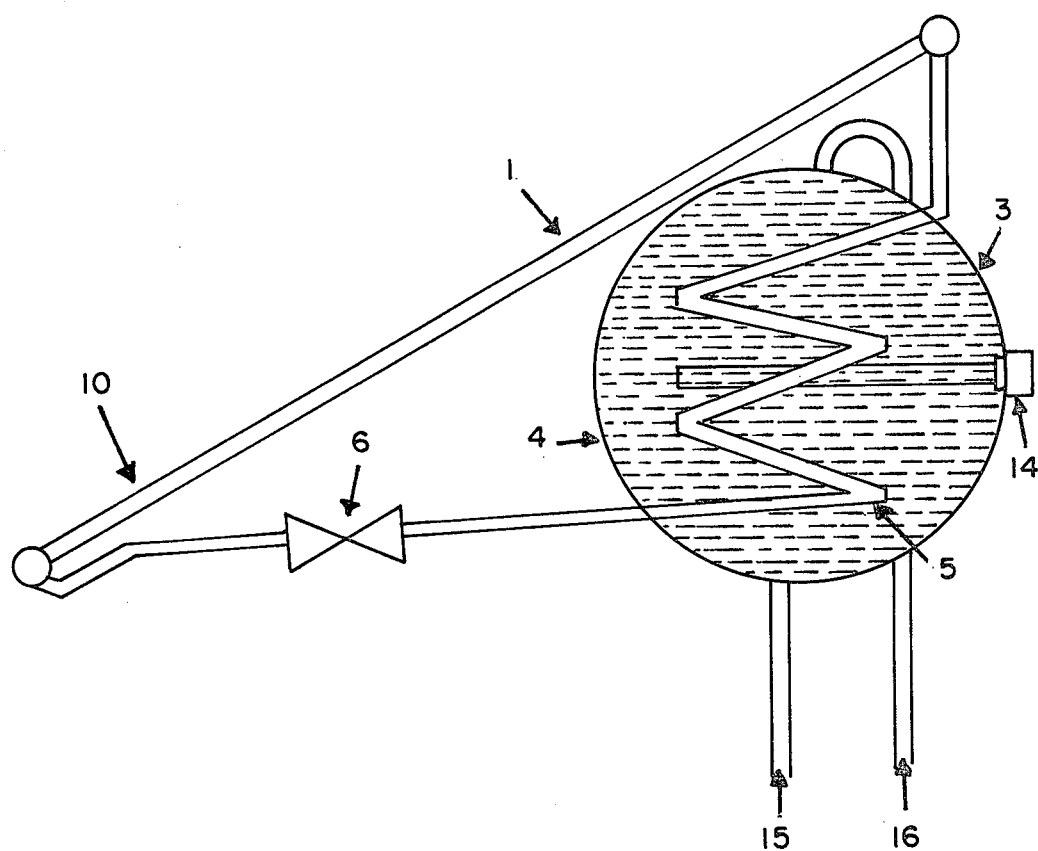
FIG. 3 is a schematic representation in cross-section of a preferred embodiment of this invention.

FIG. 3 illustrates a preferred solar water heater embodying the present invention. It shows the convenient location of condenser 3 tucked directly below a primary solar collector 1 that is inclined to optimize solar energy collection. This will provide an integral unit that is low in bulk, easy to insulate overall, and slim in configuration for convenient transportation, handling and simplicity of mounting. The average user is called upon to simply connect his cold water to inlet 15 and draw off hot water from outlet 16 to where needed. An auxiliary hot water heater 14 is also shown for water heating during periods when solar energy is low or unavailable.

FIG. 1 and FIG. 3 point out an optional, but preferred, temperature control valve 6 to prevent water overheating. This valve is selected for its capability of opening or closing in response to the water temperature in tank 4. At a certain maximum preselected water temperature, for example, valve 6 will close and heat transfer fluid condensate will collect in the condenser internal coils 5. No further condensate passing to trap 7, venturi 8 and booster collector 10, the recirculation of heat transfer fluid is thereby ceased. Accordingly, the solar collector 1 will tend to evaporate any remaining liquid heat transfer fluid, after which heat transfer both to liquid in collector 1 and from vapor to water in condenser 3 will stop. In this regard, the hold-up volume capacity in condenser coils 5 is preferably sized so as to be larger than the total liquid volume of heat transfer fluid in the sealed system. When valve 6 is closed, the primary solar collector 1 will evaporate dry and substantially all vaporized heat transfer fluid will condense and hold up in internal coils 5. Upon substantially complete condensation, the sealed system steady-state vapor pressure is concomitantly low relative to atmospheric pressure, thus safeguarding the unit from vapor pressure build-up during the non-operating mode when valve 6 is closed.

The types of temmperature control valve 6 that may be employed include those responsive directly to water temperature in tank 4. Or, indirect response to temperature can be employed such as by the use of means sensing water vapor pressure in tank 4. Water vapor pressure, of course, varies in direct relation to water temperature.

A comment regarding the height of primary solar collector 1 relative to condenser 3. Any arrangement where condensate formed in condenser 3 is unable to recirculate to the point of distribution (manifold 2) in the primary solar collection region by gravity flow, constitutes an arrangement in which the primary solar collection region is elevated above the condenser region. As to such arrangements, the invention is particularly suited.

The solar collector regions of this invention can constitute plates or panels that have now become widely known. U.S. Pat. No. 4,080,957 previously cited mentions such panels. That the primary and booster solar collection regions comprise separate plates or upper and lower regions of one plate, moreover, is a matter of choice. One plate is preferred wherein the booster collector 10 constitutes a lower area of one plate having a relatively small area for solar energy collection compared to the upper area for primary solar collection. Thus, FIG. 1, the housing for the collectors can comprise various materials of which fiber glass reinforced plastic is preferred. The glazing upon which solar radiation falls can be, and preferably is, of the same material as the housing and is usually transparent to permit penetration of the sun's rays. Internally, an absortive material or coating is provided to absorb incident radiation and cause vaporization of heat transfer fluid in a known manner. The area of solar collection (i.e. total including booster and primary collector regions) can also vary to facilitate such factors as ease of lifting onto rooftops and the like. A preferred area is from about 20 to 25 square feet, with about 21.5 being most preferred. Associated with the most preferred solar collection area can be a conventionally sized water tank forming part of the defined condenser. Thus, a water tank having a capacity of from 30 to 50 U.S. gallons, most preferably 36 U.S. gallons can be employed.

Suitable heat transfer fluids are those having a low boiling point under anticipated conditions and high latent heats of vaporization. Such materials as chlorofluorocarbons (e.g. Freon), toluene, methanol, n-butyl alcohol or the like can be employed.

The invention has been described with reference to certain preferred embodiments but it will be understood that variations within the scope of the invention are also contemplated.

What is claimed is:

1. In a method of heating water by solar radiation comprising vaporizing with solar energy a heat transfer fluid in a primary solar collection region, passing said vapor into a heat exchange region elevated below the primary solar collection region in heat exchange relationship with water, and condensing said vapor into liquid condensate in the heat exchange region, the recirculation of condensate from said heat exchange region to the primary solar collection region comprising passing said condensate by gravity into an accumulation region until said accumulation region fills to capacity and spills over excess condensate, passing said excess condensate by gravity through a venturi region into a booster solar collection region elevated below said heat exchange region, vaporizing said excess condensate in the booster collection region, and passing said vaporized excess condensate at sufficient velocity through said venturi region to both draw by suction and lift condensate accumulated in the accumulation region into the venturi region and upward into said primary solar collection region.

2. The method of claim 1 further comprising shutting off the gravity flow of condensate from said heat exchange region when the temperature of said water reaches a predetermined maximum.

3. In an apparatus for heating water by solar radiation comprising,
   primary means for containing a vaporizable heat transfer fluid and collecting solar radiation so as to vaporize said fluid,
   heat exchange means elevated below said primary means for both passing vaporized fluid formed in said primary means into heat exchange relationship with water and condensing said vaporized fluid into condensate,
   the means for recirculation of condensate from said heat exchange means to said primary means comprising,
   means of preselected condensate capacity elevated below said heat exchange region for accumulating condensate formed in and flowing by gravity from said heat exchange means,
   a venturi elevated below and communicating with said accumulating means for receiving excess condensate in excess of the preselected capacity of and flowing by gravity from said accumulating means, said venturi having a throat portion for receiving and increasing the velocity of vaporized excess condensate generated in a booster means described hereinafter, said throat portion operatively connected with said accumulation means to draw by venturi-effect condensate accumulated in said accumulation means into said throat,
   booster means elevated below and operatively connected with said venturi so as to (a) receive and expose to solar radiation and vaporize thereby excess condensate flowing by gravity from said venturi, and (b) deliver to said venturi throat vaporized excess condensate,
   and means communicating with said venturi for receiving vaporized excess condensate and condensate drawn into said throat by venturi-effect and for delivering the received vapor and condensate into said primary means.

4. Apparatus of claim 3 further comprising means responsive to a maximum preselected temperature of said water for shutting off the flow of condensate flowing from said heat exchange means to said accumulating means.

5. Apparatus of claim 4 further comprising a preselected liquid volume of heat exchange fluid, and wherein the condensate volume capacity of said heat exchange means exceeds the preselected liquid volume of said heat exchange fluid.

6. An apparatus for heating fluid by solar radiation comprising:
   (a) solar radiation collection means adapted to contain a heat transfer liquid that vaporizes in response to solar radiation,
   (b) heat exchange means adapted to receive vaporized heat transfer fluid from said solar radiation collection means wherein said heat transfer fluid is condensed to liquid form as a result of a heat transfer operation,
   (c) means cooperative with said heat exchange means for accumulating said condensed heat transfer fluid, said means for accumulating having means for expelling condensed heat transfer fluid greater than a given amount,
   (d) booster means for receiving and flash vaporizing heat transfer fluid expelled from said means for accumulating said fluid, said booster means being itself disposed to be heated by solar radiation, and
   (e) means coupled to said means for accumulating and said booster means and responsive to said flash vapor for effecting transport of heat transfer liquid from said accumulating means to said solar radiation collection means.

7. The apparatus of claim 6 wherein said heat exchange means during use is disposed at an elevation that is at least in part below said solar radiation collection means and above said booster means.

8. The apparatus of claim 7 wherein said means for effecting transport of heat transfer liquid from said accumulating means to said solar radiation collection means comprises a venturi having a throat portion for receiving and increasing the velocity of said flash vapor to thereby draw by venturi-effect condensate accumulated in said means for accumulating into said throat wherein said flash vapor transports said condensate to said solar radiation collection means.

* * * * *